Patented Nov. 13, 1928.

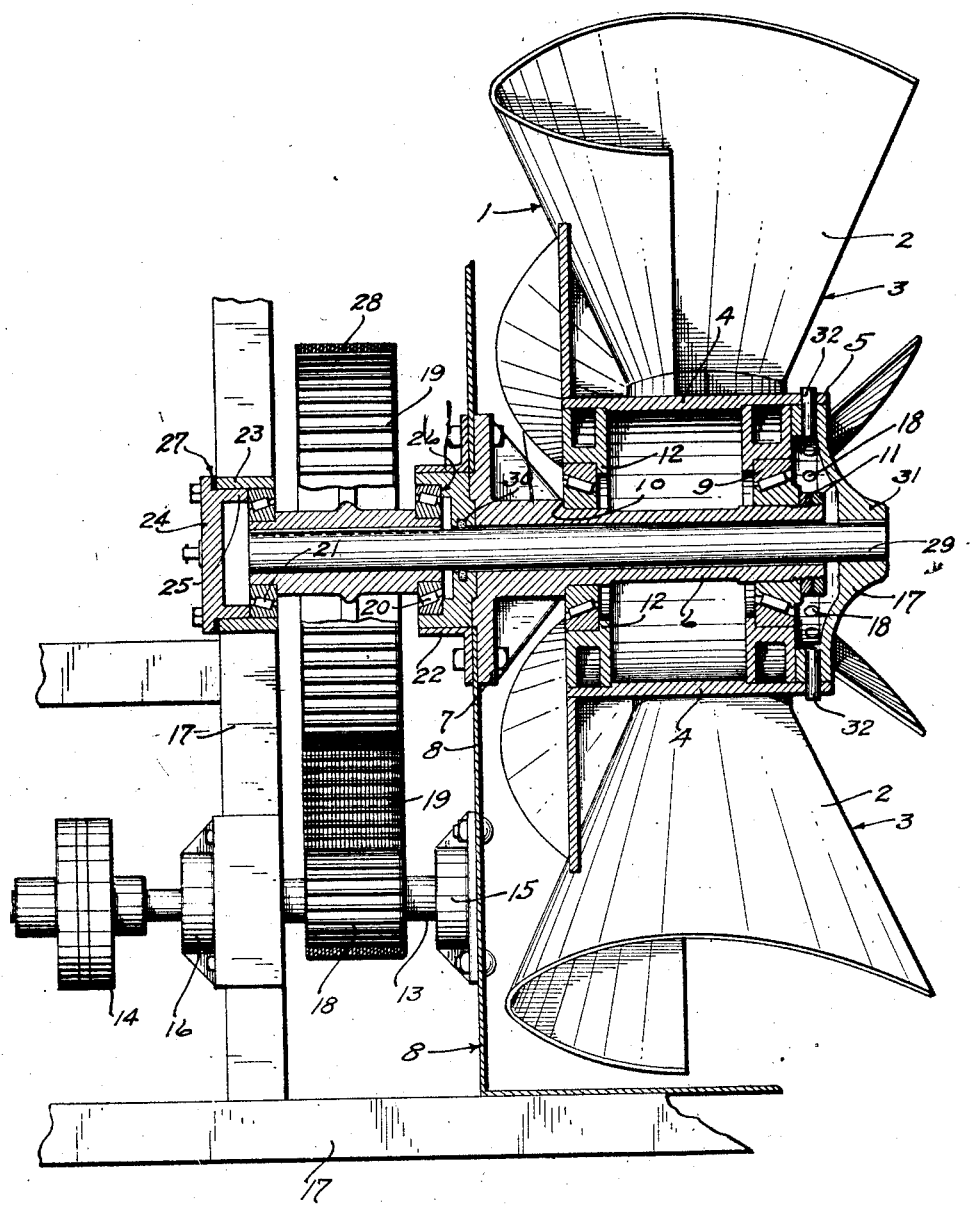

1,691,232

UNITED STATES PATENT OFFICE.

ROGER D. EDWARDS, OF ALBERT LEA, MINNESOTA.

MOUNTING AND DRIVING MEANS FOR SNOWPLOW CUTTING WHEELS.

Application filed April 17, 1926. Serial No. 102,686.

My present invention relates to improvements in snow plows of the type having cutting wheels, and, more particularly, the invention relates to novel means for mounting and driving a cutting wheel of the type disclosed and broadly claimed in my United States Letters Patent No. 1,528,969 issued March 10, 1925, and entitled "Cutting wheel for snow plows."

To the above end, generally stated, the invention consists of the novel devices and combinations of devices hereinafter described and defined in the claims.

The invention is illustrated in the single view of the drawing, which is a view partly in elevation and partly in central vertical section.

The numeral 1 indicates a full floating cutting wheel fully described in the above identified patent and comprises a plurality of radially disposed circumferentially spaced distorted cones 2 having cutting edges 3 and mounted on a large hub 4 provided with a forwardly projecting annular flange 5, for a purpose that will presently appear.

Extending axially through the hub 4 is a horizontal fixed tubular spindle 6 having at its rear end an anchoring base 7 with reinforcing webs and bolted to a housing 8 for the cutting wheel 1. Anti-friction bearings 9 are interposed between the hub 4 and the spindle 6 and rotatively support the cutting wheel 1 from said spindle. An inner shoulder 10 on the spindle 6 and a pair of nuts 11 on the outer end of said spindle adjustably hold the bearings 9 against axial separation on said spindle. Annular internal stop flanges 12 on the hub 4 hold the bearings 9 against axial movement toward each other. By thus holding the bearings 9 against axial movement on the spindle 6, the hub 4 and hence the cutting wheel 1 is securely held against axial movement in respect to said spindle.

By adjusting the nuts 11 on the spindle 6, the bearings 9 may be adjusted to compensate for wear.

The cutting wheel 1 is driven from the crank shaft of an internal combustion engine, not shown, by a sectional shaft 13 that extends parallel to the spindle 6 and the members thereof are connected by a pair of universal joints 14, only one of which is shown. The forward section of the shaft 13 is journaled in a front bearing 15, secured to the back of the housing 8, and a rear bearing 16 on a truck frame 17 which is made the subject-matter of a co-pending application executed of even date herewith.

Keyed to the shaft section 13 between the bearings 15 and 16 is a pinion 18. Overlying the pinion 18 and aligned therewith is a full floating gear 19 located back of the spindle 6 with its hub axially aligned therewith. The hub of the gear 19 has shouldered reduced ends journaled in front and rear antifriction bearings 20 and 21, respectively. The front bearing 20 is mounted in a bearing box 22 secured to the back of the housing 8 by the same bolts that the base 7 of the spindle 6 is secured thereto. The rear bearing 21 is mounted in a bearing box 23 on the frame 17 and the rear open end of said box is closed by a screw held cover plate 24 having an annular flange 25 telescoped into said bearing box as a stop for the bearing 21. The shouldered ends of the hub of the gear 19 and a shoulder 26 in the bearing box 22 and the flange 25 hold the bearings 20 and 21 and the gear 19 against axial movement. One or more shims 27 are interposed between the bearing box 23 and the cover 24, and which shims may be changed from time to time to take up wear in the bearings 20 and 21. A silent chain 28 runs over the pinion 18 and the gear 19.

A full floating driven shaft 29 extends axially through the spindle 6 and circumferentially spaced therefrom with its rear end portion keyed in the hub of the gear 19. The bearings 20 and 21 are packed in grease and which grease is kept from escaping into the spindle 6 by a pliable packing 30 mounted in an internal groove in the bearing box 22 and rubs on the shaft 29.

Keyed to the shouldered forward end of the shaft 29 is a disk-like face plate that affords a head 31 that closely fits within the annular hub flange 5 of the cutting wheel 1. A plurality of shearing pins 32 are mounted in aligned radial bores in the hub flange 5 and the periphery of the head 31 and connect the cutting wheel 1 to the driven shaft 29. Said shearing pins 32 are preferably made from hard wood and their number and strength are such as to securely connect the cutting wheel 1 to the driven shaft 29 for ordinary work, but in case the work is too heavy or said wheel strikes an obstruction, such as ice, rock or the like, the pins 32 will be sheared, which will disconnect the head 31 from the flange 5, thus preventing the breaking of the snow or placing it under such strain as to bend or otherwise damage the same.

From the above description it is evident that the rear end of the shaft 29 is carried in the hub of the gear 19 and its front end is carried by the head 31 which in turn has its bearing on the inner surface of the hub flange 5. By thus mounting the shaft 29, the same is entirely free from and out of engagement with the spindle 6. In case the shearing pins 32 are sheared by a heavy load the head 31, as it is carried in the hub flange 5, will not fall down but simply rotate in said flange, hence the outer end of the shaft 29 will be supported without putting any undue strain on the hub of the gear 19. As the gear 19 is a full floating proposition the shaft 29 with the attached head 31 can be pulled directly out of the hub of the gear 19 after the shearing pins 32 have been removed and yet held to alignment so that said shaft can again be reinserted in the hub of the gear 19 without any difficulty whatsoever.

In case the pins 32 have been sheared, it is only necessary to remove the broken pieces thereof and substitute new shearing pins to again connect the wheel 1 to the driven shaft 29.

In the arrangement described, not only is the weight of the cutting wheel carried to the plow frame through the fixed spindle 6, but the pressure applied to the cutting wheel when forced against snow drifts will be transmitted in like manner and the driving shaft 29 is in all cases relieved from all strains except the driving torque.

What I claim is:

1. In a snow plow, the combination with a fixed tubular spindle, and a driven shaft extending through said spindle, said shaft being unsupported within the spindle and out of peripheral contact therewith, of a full floating cutting wheel journaled on said spindle, and a shearing pin connecting the cutting wheel to said shaft.

2. In a snow plow, the combination with a fixed tubular spindle, of a cutting wheel journeled on said spindle, a driven wheel axially aligned with said spindle, and a shaft extending through said spindle and having one of its ends keyed in the hub of the driven wheel and its other end secured to the cutting wheel, said shaft being unsupported within the spindle and out of peripheral contact therewith.

3. In a snow plow, the combination with a fixed tubular spindle, of a cutting wheel journaled on said spindle, a driven wheel axially aligned with said spindle, a shaft extending through said spindle and having one of its ends keyed in the hub of the driven wheel and at its other end a head carried by the cutting wheel for rotation in respect thereto, said shaft being unsupported within the spindle and out of peripheral contact therewith, and a shearing pin connecting the cutting wheel to said head.

4. In a snow plow, the combination with a fixed tubular spindle, of a full floating cutting wheel journaled on said spindle and having a hub flange, a full floating driven wheel axially aligned with said spindle, a full floating shaft extending axially through said spindle and having one of its ends keyed in the hub of the driven wheel and at its other end a head mounted in said hub flange for rotation in respect thereto, said shaft being unsupported within the spindle and out of peripheral contact therewith, and a shearing pin connecting the cutting wheel to the hub flange.

5. In a snow plow, the combination with a fixed tubular spindle, of a full floating cutting wheel journaled on said spindle and having a hub flange, a full floating driven wheel axially aligned with said spindle, a full floating shaft extending axially through said spindle and having one of its ends keyed in the hub of the driven wheel and at its other end a head mounted in said hub flange for rotation in respect thereto, said hub flange and head having a plurality of radially aligned holes, said shaft being unsupported within the spindle and out of peripheral contact therewith, and shearing pins mounted in said holes and connecting the cutting wheel to the hub flange.

6. In a snow plow, the combination with a plow frame, of a fixed spindle, a cutting wheel journaled on said spindle and supported thereby, a floating shaft extending axially through said spindle and connected at its front end to the hub of said cutting wheel, said shaft being unsupported within the spindle and out of peripheral contact therewith, and means applied to said floating shaft at the rear of said spindle for rotating the same and the cutting wheel.

7. In a snow plow, the combination with a plow frame, of a fixed spindle, a cutting wheel journaled on said spindle and supported thereby, a floating shaft extending axially through said spindle and connected at its front end to the hub of said cutting wheel, a bearing for said floating shaft spaced rearward of said spindle, said shaft being unsupported within the spindle and out of peripheral contact therewith, and means for driving said shaft, including a gear secured thereto in the space between said rear bearing and spindle.

8. The structure defined in claim 6 in which the connection between the front end of said floating shaft and the hub of said cutting wheel is detachable and includes a relative fragile coupling element constituting a safety device.

In testimony whereof I affix my signature.

ROGER D. EDWARDS.